L. T. STANLEY.
JIG-SAW.
No. 191,189.                                  Patented May 22, 1877.
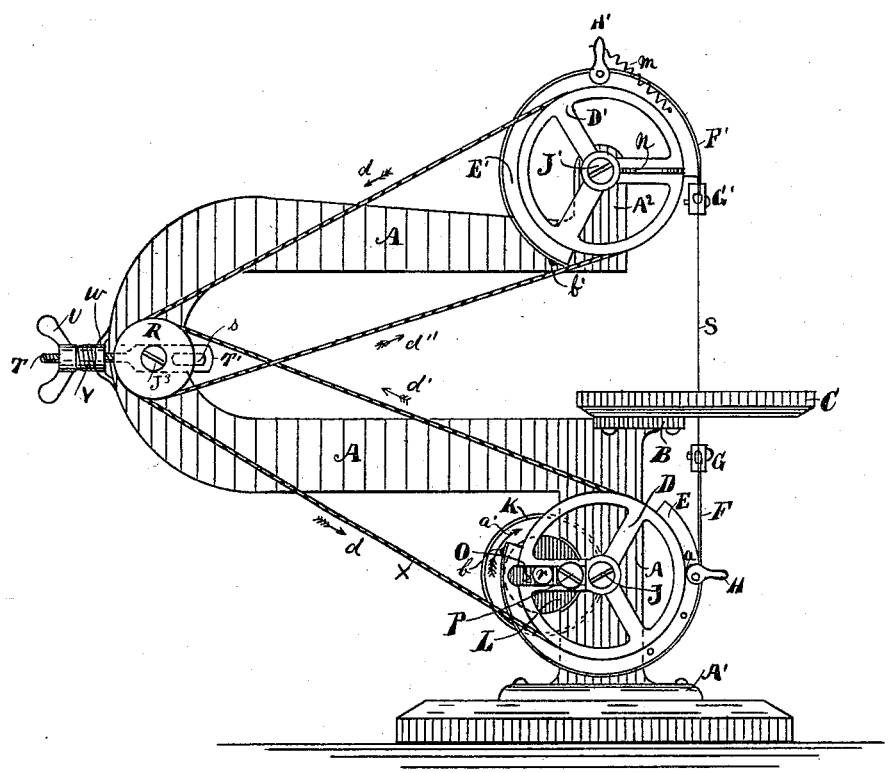
WITNESSES;
Edda Krauth.
Ida Smith.
INVENTOR.
Lucius T. Stanley
Per: E. C. Krinik
his Attorney

UNITED STATES PATENT OFFICE.

LUCIUS T. STANLEY, OF INDIANAPOLIS, INDIANA.

IMPROVEMENT IN JIG-SAWS.

Specification forming part of Letters Patent No. 191,189, dated May 22, 1877; application filed March 16, 1877.

*To all whom it may concern:*

Be it known that I, LUCIUS T. STANLEY, of Indianapolis, county of Marion, State of Indiana, have invented Improvements in Jig-Saws, of which the following is a description, reference being had to the accompanying drawings.

My invention consists in attaching two partially-flanged wheels to the frame, one above and one below, said wheels having a uniform motion given to each in the same direction, by means of an equalizing-belt, which passes over the periphery of each of the two partially-flanged wheels, and over a double-grooved sheave located at the rear of the frame, in such a manner as to allow the belt to be adjusted and all slack taken up. The flanged wheels are provided with eccentric binders to secure the belt and prevent it from slipping. The upper partially-flanged wheel is provided with a fan-wing attached to one of the spokes, so as to blow or fan away the saw-dust from the work. The lower partially-flanged wheel receives power from a crank-wheel operated in the usual manner. The crank-wheel is provided with a wrist-pin, which operates in a slotted arm of the lower flanged wheel in such a manner as to cause the wheel to partially revolve on its axle with a quick motion one way, and a slow motion the other way; all of which improvements will be fully set forth and described as follows:

In the drawings I have represented my improvement by a side elevation.

A A A represent part of the frame, united to the standard or base A, as shown. At the top of the upright standard A, above the base $A^1$ is a bracket, B, which supports the table C, as shown, about midway between the table C and base $A^1$. The lower partially-flanged wheel D is supported on the standard $A^1$ by a pivot-stud, J. One of the spokes of this wheel is provided with a slot, O, in which operates the wrist-pin P of crank-wheel L, the operation of which will be hereafter fully described. The periphery of wheel D is provided with a groove, in which operates the belt $x$, and at one side of this belt-groove is the flange E, which extends about two-thirds around the wheel, in the manner shown. On this flange E, at $b$, is secured one end of the flexible belt F, the other end being attached to the saw-clamp G, in the manner shown. At the side of the flange E is pivoted an eccentric clamp, H, which is designed to bind the belt $x$ in the groove formed in the periphery of the wheel D, and prevent the belt from slipping, and also to allow the wheel D to be adjusted when required, as will be hereafter described. The upper wheel D' is constructed in the same manner as the wheel D, and has the flexible band F' secured the same as the band F on the wheel below; but the wheel D' has no slot in its arm, and is provided with a wing or fan-blade, $n$, in such a manner as to fan away the dust from the work when the machine is in operation. The wheel D' is secured to the upright arm $A^2$ of frame A by the stud $J^1$, as shown.

At the rear of the frame A A is pivoted a double-grooved sheave, R, the pivot $J^3$ being secured in the slide T'. The slide is held in position on the frame A by means of a pin that operates in the slot O and the screw end T, which passes through a lug, $w$, also formed on or attached to the frame A, as shown. The slide T' is provided with an adjusting-nut, U, and tension-spring V, in such a manner as to hold the belt X taut on the wheels D D' and sheave R.

The belt $x$ passes over wheel D in the direction of arrow $d$, and extends back over sheave R in the direction of arrow $d'$; thence to wheel D', as indicated by arrow $d''$; thence back over the rear sheave R to wheel D. By this arrangement the motion of the two wheels D D' is equalized, and a uniform motion given to each wheel. The crank-wheel L is supported by proper boxes in the frame-standard A, and is operated by the pulley K, which revolves in the direction of the arrow $a'$. The crank or wrist pin P operates in the slot O, and, as it approaches the position shown in the drawings, gives a quick motion to the saw in an upward direction, and as the wrist-pin P approaches the outer end of the slot O, the saw has a slower downward motion given to it. The saw S is secured in the clamps G G' in the usual manner; but when a longer or shorter saw is required, then the eccentric clamps H are loosened, and the wheel D is turned in the required direction to accommodate the length of saw used, after which the binding-eccentrics are again pressed against the belt $x$, and the machine is adjusted.

I am aware that saws have been operated on the peripheries of segments, and to such apparatus I make no claim.

What I claim as new, and wish to secure by Letters Patent, is—

1. The combination, with the wheels D D', provided with segmental flanges E E, of a jig-saw device, of the eccentric clamps H H, for adjusting the bands F F' on the wheels, as specified.

2. The wheels D D' of a jig-saw device, carrying the bands and saw, in combination with the crank-wheel L and its pin P, adapted to a radial slot in the wheel D, as set forth.

3. A jig-saw device consisting of the frame A, wheels D D', crank-wheel L, wrist-pin P, clamps H, sheaves R, and endless ropes or belts $x$ and F, constructed and arranged to operate as shown and described.

4. The spring-slide T', screw T, and nut U, combined with the double sheave R, belts $x$ and F, wheels D D', carrying the belt and saw, as specified.

In testimony whereof I have signed my name to this specification in the presence of two subscribing witnesses.

LUCIUS T. STANLEY.

Witnesses:
   E. O. FRINK,
   E. P. ABBOTT.